United States Patent [19]

Du et al.

[11] Patent Number: 5,129,472

[45] Date of Patent: Jul. 14, 1992

[54] WEIGHING APPARATUS

[75] Inventors: Gin D. Du, Chang Hua Hsien; Bao H. Tung, Puu Yen Hsiang, both of Taiwan

[73] Assignee: Bao Hung Tung, Chang Hua Hsien, Taiwan

[21] Appl. No.: 692,164

[22] Filed: Apr. 26, 1991

[51] Int. Cl.⁵ .............. G01G 5/04; G01G 21/28; G01G 21/22
[52] U.S. Cl. ............................ 177/208; 177/241; 177/254; 177/262
[58] Field of Search ............... 177/208, 239-241, 177/254, 262

[56] References Cited

U.S. PATENT DOCUMENTS

| 3,378,090 | 4/1968 | Christie | 177/208 |
| 4,002,216 | 1/1977 | Solow | 177/208 |
| 4,153,125 | 5/1979 | Hutchinson et al. | 177/241 X |
| 4,253,534 | 3/1981 | Hall et al. | 177/241 |
| 4,537,266 | 8/1985 | Greenberg | 177/208 |

FOREIGN PATENT DOCUMENTS 2308091 11/1976 France .............................. 177/208

Primary Examiner—George H. Miller, Jr.
Attorney, Agent, or Firm—Dellett, Smith-Hill and Bedell

[57] ABSTRACT

A weighing device includes a housing disposed on an upper end of a post, a displayer disposed on the housing, a piezoelectric element disposed in the housing and having one end located above the opening of the housing, an air bag disposed on a base, a tube coupled to the post and connected to the air bag, and an expandable member disposed on an upper end of the tube for pushing the piezoelectric element when an object is put on the air bag. A signal corresponding to the weight of the object is generated and displayed on the displayer.

3 Claims, 3 Drawing Sheets

WEIGHING APPARATUS

BACKGROUND OF THE INVENTION

1. Field of the Invention

The present invention relates to a weighing apparatus, and more particularly to an air envelope or air bag type weighing apparatus.

2. Description of the Prior Art

The weighing scales which are commercially available at present are mechanical or electrical type scales. As far as applicant is aware, there is no weighing apparatus which utilizes air bag for weighing objects.

The present invention has arisen to provide a novel weighing apparatus.

SUMMARY OF THE INVENTION

The primary objective of the present invention is to provide a weighing apparatus which utilizes an air bag for weighing objects.

In accordance with one aspect of the invention, there is provided a weighing device which includes a base, a post fixed to the base, a housing disposed on an upper end of the post, a displayer provided upon the housing, an opening being formed in a bottom of the housing, a piezoelectric element disposed in the housing and having one end located above the opening of the housing, an air bag disposed upon the base, a tube coupled to the post and connected to the air bag, and a member which is expandable being disposed on an upper end of the tube and extending through the opening of the housing. The member is caused to expand in order to push the piezoelectric element when an object is put on the air bag so that a signal corresponding to a weight of the object is generated by the piezoelectric element and can be displayed on the displayer after converted to a digital output.

Further objectives and advantages of the present invention will become apparent from a careful reading of the detailed, description provided hereinbelow, with appropriate reference to the accompanying drawings.

DETAILED DESCRIPTION OF THE INVENTION

Figure 1:
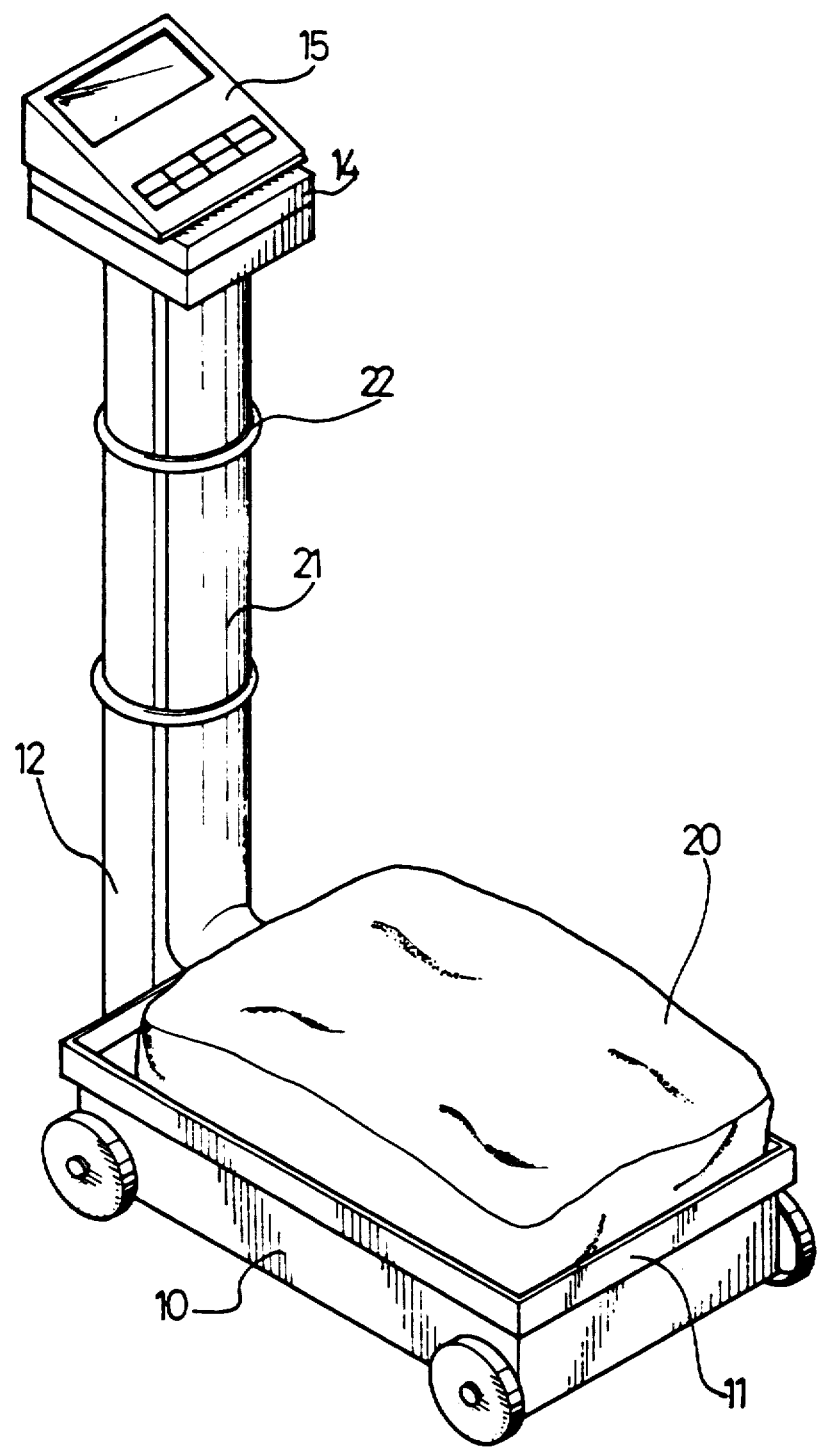
FIG. 1 is a perspective view of a weighing apparatus in accordance with the present invention.
Figure 2:
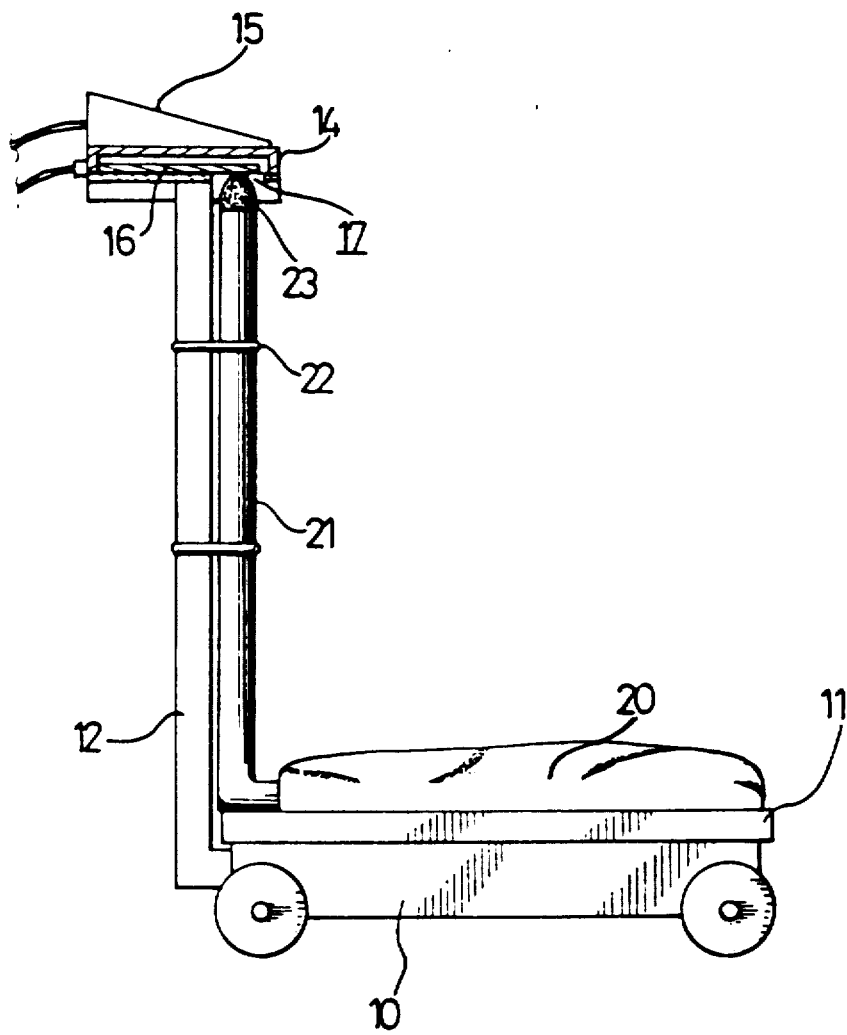
FIG. 2 is a plane view of the weighing apparatus.

Referring to the drawings and initially to FIGS. 1 and 2, a weighing apparatus in accordance with the present invention comprises generally a base 10, a tray 11 disposed upon the base 10, a post 12 fixed on one side of the base 10 and extended upward from the base 10, a housing 14 fixed on the upper end of the post 12, and a displayer 15 disposed upon the housing 14. An opening 17 is formed in the bottom of the housing 14 and is located beside the post 12. As shown in FIG. 2, a piezo-sensor or piezoelectric element 16 is disposed in the housing 14 and has one end located above the opening 17.

An air bag 20 is disposed on the tray 11. A tube 21 is coupled to the post 12 by two retaining rings 22 and has a lower end connected to the air bag 20. A member 23 which is expandable is provided on the upper end of the tube 21 and extends through the opening 17 of the housing 14. It is to be noted that both air bag 20 and tube 21 and non-expandable so that the member 23 can be caused to expand when an object is put on the air bag 20. The air bag 20 is substantially filled with air. The member 23 is arranged such that it contacts and applies no force onto the piezoelectric element 16 when no object is disposed upon the air bag 20.

Figure 3:
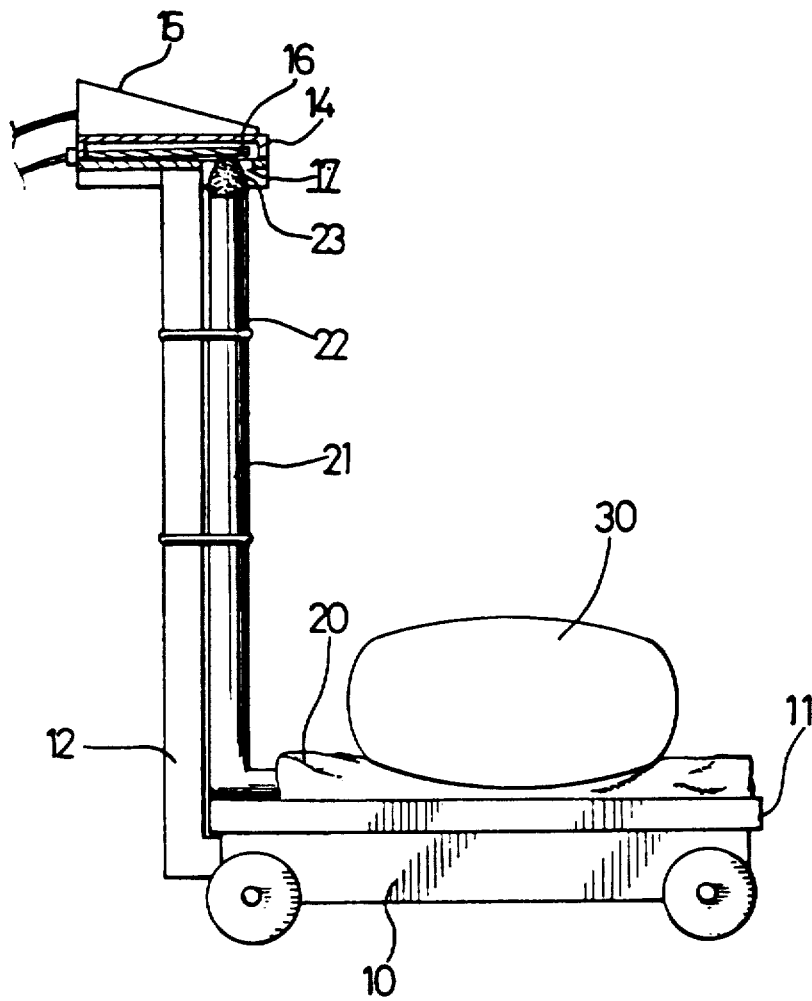
FIG. 3 is a plane view illustrating the operations of the present invention.

In operation, as shown in FIG. 3, when an object 30 is put on the air bag 20, the member 23 is caused to expand and pushes the piezoelectric element 16 so that a signal or a piezoelectricity is generated and is converted to a digital output which can be displayed on the displayer 15. The material of the member 23 is selected such that the expansion thereof is proportional to the weight of the object disposed upon the air bag 20, and the digital output is calibrated such that the weight of the object can be exactly shown on the displayer 15.

The objects, which have spherical or cylindrical outer surfaces or other round surfaces that can not be stably supported upon a plane surface, can be stably supported upon the air bag so that any object can be easily weighed by the weighing apparatus in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A weighing apparatus comprising a base, a post fixed to said base and extended upward therefrom, a housing disposed on an upper end of said post, a displayer provided upon said housing, an opening being formed in a bottom of said housing, a piezoelectric element disposed in said housing and having one end located above said opening of said housing, an air bag filled with air and disposed upon said base, a tube coupled to said post and connected to said air bag, and a member which is expandable being disposed on an upper end of said tube and extending through said opening of said housing; said member being caused to expand in order to push said one end of said piezoelectric element when an object is put on said air bag so that a signal corresponding to a weight of said object is generated and displayed on said displayer.

2. A weighing apparatus according to claim 1, wherein a tray is fixed upon said base, and said air bag is disposed upon said tray.

3. A weighing apparatus according to claim 1, wherein at least one retaining ring couples said tube to said post.

* * * * *